US012779997B2

(12) United States Patent
Jiang et al.

(10) Patent No.: US 12,779,997 B2
(45) Date of Patent: Nov. 3, 2026

(54) MAP INFORMATION DISPLAY METHOD, ELECTRONIC DEVICE, AND MEDIUM

(71) Applicant: HUAWEI TECHNOLOGIES CO., LTD., Shenzhen (CN)

(72) Inventors: Baohan Jiang, Shanghai (CN); Kan Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 18/670,443

(22) Filed: May 21, 2024

(65) Prior Publication Data

US 2024/0308343 A1 Sep. 19, 2024

Related U.S. Application Data

(63) Continuation of application No. PCT/CN2022/110863, filed on Aug. 8, 2022.

(30) Foreign Application Priority Data

Nov. 30, 2021 (CN) ......................... 202111473748.X

(51) Int. Cl.
*B60K 35/28* (2024.01)

(52) U.S. Cl.
CPC ........ *B60K 35/28* (2024.01); *B60K 2360/168* (2024.01); *B60K 2360/176* (2024.01); *B60K 2360/21* (2024.01)

(58) Field of Classification Search
CPC .............. B60K 35/28; B60K 2360/168; B60K 2360/176; B60K 2360/21; G01C 21/367;
(Continued)

(56) References Cited

U.S. PATENT DOCUMENTS 8,306,735 B2 * 11/2012 Mudalige ........... G01C 21/3667 340/995.1
2006/0282214 A1 * 12/2006 Wolterman ............ G01C 21/26 340/995.14

(Continued)

FOREIGN PATENT DOCUMENTS

CN 106878934 A 6/2017
CN 111126130 A 5/2020

(Continued)

*Primary Examiner* — Richard M Camby
(74) *Attorney, Agent, or Firm* — WOMBLE BOND DICKINSON (US) LLP

(57) ABSTRACT

A map information display method, an electronic device, and a medium are disclosed in this application. The map information display method includes: obtaining a first map, where the first map includes map elements related to a current driving route of a vehicle in which the electronic device is located; and displaying a second map, where the second map includes a first part of map elements in the map elements. According to the map information display method, the electronic device can obtain the current driving route of the vehicle, screen out, from map elements displayed in a map application, map information related to the current driving route, present the map information to a user driving the vehicle, and hide map information irrelevant to the current driving route.

20 Claims, 10 Drawing Sheets

(58) Field of Classification Search
CPC ............ G01C 21/3658; G01C 21/3655; G08G 1/0969; G06F 16/29
See application file for complete search history.

(56) References Cited

U.S. PATENT DOCUMENTS

| | | | | |
|---|---|---|---|---|
| 2011/0015854 | A1* | 1/2011 | Mudalige | G01C 21/3626 701/533 |
| 2011/0112746 | A1* | 5/2011 | Takazawa | G01C 21/3626 701/117 |
| 2013/0338918 | A1* | 12/2013 | Zyskowski | G01C 21/3644 701/533 |

FOREIGN PATENT DOCUMENTS

| | | | |
|---|---|---|---|
| CN | 111597286 | A | 8/2020 |
| CN | 211792049 | U | 10/2020 |
| CN | 113587952 | A | 11/2021 |
| CN | 113639760 | A | 11/2021 |
| WO | 2021231906 | A1 | 11/2021 |

* cited by examiner

MAP INFORMATION DISPLAY METHOD, ELECTRONIC DEVICE, AND MEDIUM

CROSS-REFERENCE TO RELATED APPLICATIONS

This application is a continuation of International Application No. PCT/CN2022/110863, filed on Aug. 8, 2022, which claims priority to Chinese Patent Application No. 202111473748.X, filed on Nov. 30, 2021. The disclosures of the aforementioned applications are hereby incorporated by reference in their entireties.

TECHNICAL FIELD

Embodiments of this application relate to the field of intelligent driving, and in particular, to a map information display method, an electronic device, and a medium.

BACKGROUND

In a driving process, a driver may use a map application to assist driving, and an interface of the map application is usually displayed on a screen of an in-vehicle infotainment of a vehicle. In the driving process, the map application may obtain various map information related to a driving route, such as a traffic light, a traffic sign, a parking lot, and a gas station, and present the map information to the user by using the screen of the in-vehicle infotainment or voice, so that the driver can fully master a driving condition and a driving environment of the vehicle in time. However, some information in the map information is useless to the driver in motion, sometimes causes interference, and is inconvenient for the driver to confirm the driving route. For example, when the vehicle continues to go straight after passing an intersection, the interface of the map application displays traffic lights in a straight lane and a turning lane. If there is a parking lot or a gas station near the intersection, the map application also displays the parking lot or the gas station. If there are many roads in the area, the interface of the map application further displays traffic lights of other roads irrelevant to the driving route of the vehicle. If the map information is not screened and is presented to the driver one by one, too much map information is presented, and driving experience of the driver is affected.

SUMMARY

An objective of this application is to provide a map information display method, an electronic device, and a medium.

A first aspect of this application provides a map display method, applied to an electronic device, and including:

- obtaining a first map, where the first map includes map elements related to a current driving route of a vehicle in which the electronic device is located; and
- displaying a second map, where the second map includes a first part of map elements in the map elements.

In this embodiment of this application, the electronic device herein may be an in-vehicle infotainment, and the current driving route may be a road on which the vehicle is traveling, or may be a lane on the road on which the vehicle is traveling. The map element herein may be map information, and the map information may include a location, a type, a width, a slope, and a curvature of a lane, a traffic sign, a traffic light, an electronic camera, a roadside landmark, a parking lot, and a gas station. The electronic device may screen out, from the map elements, the first part of map elements related to the current driving route, such as a traffic light, an electronic camera, a road sign, and a speed limit sign that indicate a current lane in which the vehicle travels, and hide map information irrelevant to the current driving route, for example, buildings on both sides of the current lane in which the vehicle travels, and a traffic light, an electronic camera, a road sign, and the like that indicate another lane.

According to the method in this embodiment of this application, the electronic device may obtain the current driving route of the vehicle, screen out, from the map elements displayed by a map application, the map information related to the current driving route, and present the map information to a user driving the vehicle, and hide the map information irrelevant to the current driving route. In this way, in a driving process, the user can more clearly master the map information related to the current driving route, thereby improving driving experience of the user.

In a possible implementation of the first aspect, the first part of map elements include at least one of the following:

- an electronic camera, a road sign, a traffic light, and a speed limit sign.

In a possible implementation of the first aspect, the electronic camera, the road sign, and the traffic light are located in front of the driving route of the vehicle.

In a possible implementation of the first aspect, the speed limit sign is located in front of the driving route of the vehicle or behind the driving route of the vehicle.

In this embodiment of this application, the electronic device may screen out the first part of map elements in front of the current driving route of the vehicle for display, and hide a map element behind the current driving route of the vehicle. For the speed limit sign, even if the vehicle has left a location of the speed limit sign, the electronic device may still display the speed limit sign that indicates the current driving route of the vehicle.

In a possible implementation of the first aspect, the current driving route of the vehicle includes at least a first lane and a second lane.

In a possible implementation of the first aspect, if the vehicle travels in the first lane, at least one of the electronic camera, the road sign, the traffic light, and the speed limit sign that is in the first part of map elements and that indicates the first lane is displayed.

In one embodiment, in this embodiment of this application, the first lane herein may be a lane in which the vehicle is traveling, and the electronic device may screen out the electronic camera, the road sign, and the traffic light that indicate the first lane for display. The traffic light is located in front of the driving route of the vehicle and is located at a first intersection connected to the first lane.

According to the method in this embodiment of this application, the electronic device may screen out the map information related to the first lane and present the map information to the user driving the vehicle, and hide the map information irrelevant to the first lane. This can reduce an amount of map information displayed in the electronic device. In this way, the user can more accurately master the map information of the first lane in which the vehicle is currently traveling, thereby bringing better driving experience.

In a possible implementation of the first aspect, the method further includes:

- if the vehicle travels from the first lane to the second lane, displaying at least one of the electronic camera, the road sign, the traffic light, and the speed limit sign that is in the first part of map elements and that indicates the second lane; and hiding at least one of the electronic camera, the road sign, the traffic light, and the speed limit sign that indicates only the first lane.

In one embodiment, in this embodiment of this application, when the vehicle travels from the first lane to the second lane, in other words, the lane in which the vehicle is traveling is the second lane, the electronic device may screen out an electronic camera, the road sign and the traffic light that indicates the second lane for display. At the same time, an electronic camera, a road sign, and a traffic light that indicate only the first lane are hidden. For example, if only one traffic light is disposed in front of the first lane and the second lane, the electronic device may display the traffic light regardless of whether the vehicle travels in the first lane or the second lane.

According to the method in this embodiment of this application, the electronic device may update displayed map information in real time based on a change of a lane in which the vehicle travels. After the electronic device detects that the vehicle enters the second lane from the first lane, the vehicle may screen out map information related to the second lane and present the map information to the user driving the vehicle, and hide the map information irrelevant to the second lane, so that the user can master the map information of the current driving route of the vehicle in a more timely manner, thereby bringing better driving experience.

In a possible implementation of the first aspect, the obtaining a first map includes:

obtaining the first map based on predicted driving information of the vehicle in a preset time period, where the preset time period is determined based on at least one of a display refresh frequency of the map and a driving speed of the vehicle.

In a possible implementation of the first aspect, the predicted driving information includes at least one of the following: the current driving route, a driving direction, and the driving speed of the vehicle.

In a possible implementation of the first aspect, the displaying a second map includes:

hiding a second part of map elements that are in the map elements and whose element types are different from those of the first part of map elements, and retaining the first part of map elements.

In a possible implementation of the first aspect, the second part of map elements include at least one of the following: a building, a weight limit sign, and a road sign.

In one embodiment, in this embodiment of this application, the electronic device may hide the second part of map elements that are irrelevant to the current driving route of the vehicle, such as the building, the weight limit sign, and the road sign.

A second aspect of this application provides a map display apparatus, used in an electronic device, and the display apparatus includes:

a map obtaining module, configured to obtain a first map, where the first map includes map elements related to a current driving route of a vehicle in which the electronic device is located; and a map display module, configured to display a second map, where the second map includes a first part of map elements in the map elements, and the first part of map elements include at least one of an electronic camera, a road sign, a traffic light, and a speed limit sign.

In a possible implementation of the second aspect, the map display module determines that the electronic camera, the road sign, and the traffic light are located in front of the driving route of the vehicle.

In a possible implementation of the second aspect, the map display module determines that the speed limit sign is located in front of the driving route of the vehicle or behind the driving route of the vehicle.

In a possible implementation of the second aspect, the map display module determines that the current driving route of the vehicle includes at least a first lane and a second lane.

In a possible implementation of the second aspect, if the vehicle travels in the first lane, the map display module displays at least one of the electronic camera, the road sign, the traffic light, and the speed limit sign that is in the first part of map elements and that indicates the first lane.

In a possible implementation of the second aspect, if the vehicle travels s from the first lane to the second lane, the map display module displays at least one of the electronic camera, the road sign, the traffic light, and the speed limit sign that is in the first part of map elements and that indicates the second lane, and the map display module hides at least one of the electronic camera, the road sign, the traffic light, and the speed limit sign that indicates only the first lane.

A third aspect of this application provides an electronic device, including:

a memory and a processor. The processor is configured to execute instructions of the map display method provided in the first aspect.

The memory may be coupled to or decoupled from the processor to store the instructions executed by the processor.

A fourth aspect of this application provides a computer-readable storage medium. The computer-readable storage medium includes instructions, and when the instructions are executed by a controller of an electronic device, the electronic device is enabled to implement the map display method provided in the first aspect.

DESCRIPTION OF EMBODIMENTS

Embodiments of this application include but are not limited to a map information display method, an electronic device, and a medium. To make objectives, technical solutions, and advantages of embodiments of this application clearer, the following further describes implementations of embodiments of this application in detail with reference to accompanying drawings.

To resolve a problem that a map application displays too much map information in a driving process, this application discloses the map information display method. A driving route of a vehicle is obtained, map information related to the driving route is screened from the map information displayed by the map application and presented screened map information to a user driving the vehicle, and map information irrelevant to the driving route is hidden, so that the user can more clearly master the map information related to the current driving route in the driving process, thereby improving driving experience of the user.

Figure 1:
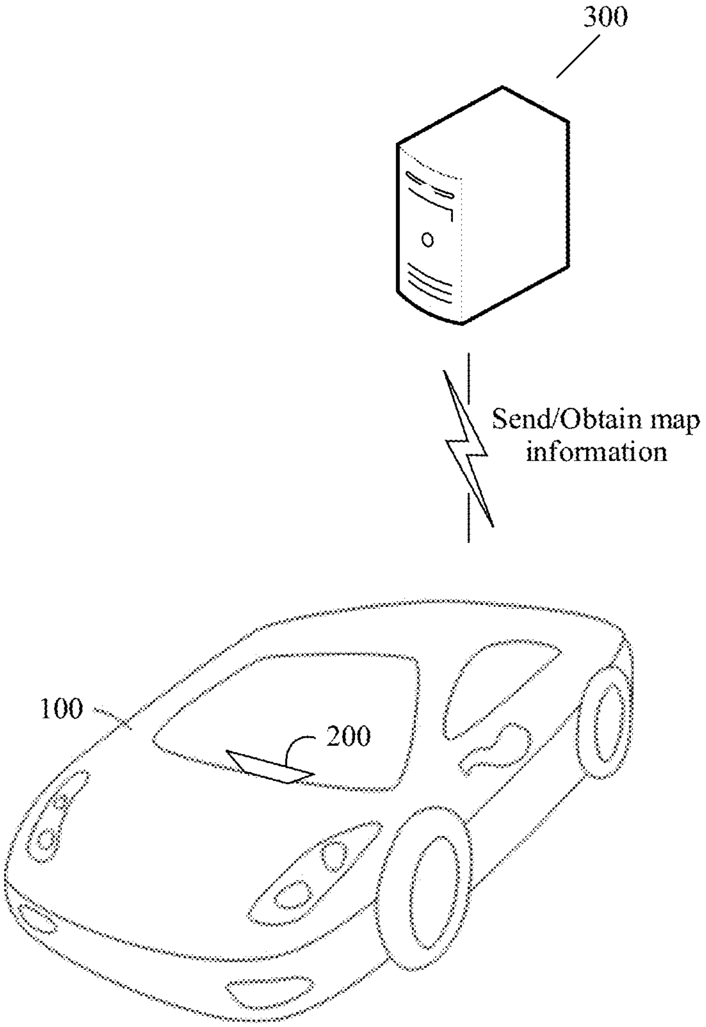
FIG. 1 is a schematic diagram of a scenario in which a user drives a vehicle according to an embodiment of this application.

For example, FIG. 1 describes a scenario in which a user drives a vehicle 100 according to an embodiment of this application. In FIG. 1, the user enables a map application of an electronic device 200, and the map application may obtain map information from a server 300. In a driving process of the vehicle 100, the electronic device 200 determines a driving route of the vehicle 100, for example, a route from a current location of the vehicle 100 to a next location. The electronic device 200 further obtains map information, for example, a traffic light or a traffic sign around the current location of the vehicle 100, in real time based on the current location of the vehicle 100. In this embodiment of this application, after the electronic device 200 screens the map information based on the driving route of the vehicle 100, and screens out map information related to the driving route, for example, after the electronic device 200 screens out map information related to a lane, a driving direction, and a driving speed included in the driving route, the electronic device 200 displays the map information related to the driving route, and hides map information irrelevant to the driving route. For example, for the vehicle 100 driving in a straight lane, the electronic device 200 may display only a traffic light corresponding to the straight lane, and hide a traffic light of a turning lane. When a type of the vehicle 100 is a car, the electronic device 200 may further display only a speed limit sign related to the driving speed, and hide a weight limit sign and a height limit sign.

It may be understood that the electronic device 200 in this embodiment of this application may be an in-vehicle infotainment, a laptop computer, a desktop computer, a tablet computer, a mobile phone, a wearable device, a head-mounted display, a mobile email device, a portable game console, a portable music player, a reader device, or another electronic device that can access a network. In some implementations, embodiments of this application may also be applied to a wearable device worn by the user, for example, a smartwatch, a smart band, jewelry (for example, a device for making decorative item such as earrings and a bracelet) or glasses, or as a part of the smartwatch, the smart band, the jewelry or the glasses.

The server 300 may be a hardware server, or may be embedded in a virtualization environment. For example, according to some embodiments of this application, the server 300 may be a virtual machine executed on a hardware server including one or more other virtual machines. According to this embodiment of this application, the server 300 may interact with the electronic device 200 through a network, for example, send the map information included in the map application to the electronic device 200, and/or receive map information from the electronic device 200 to update a map.

Figure 2:
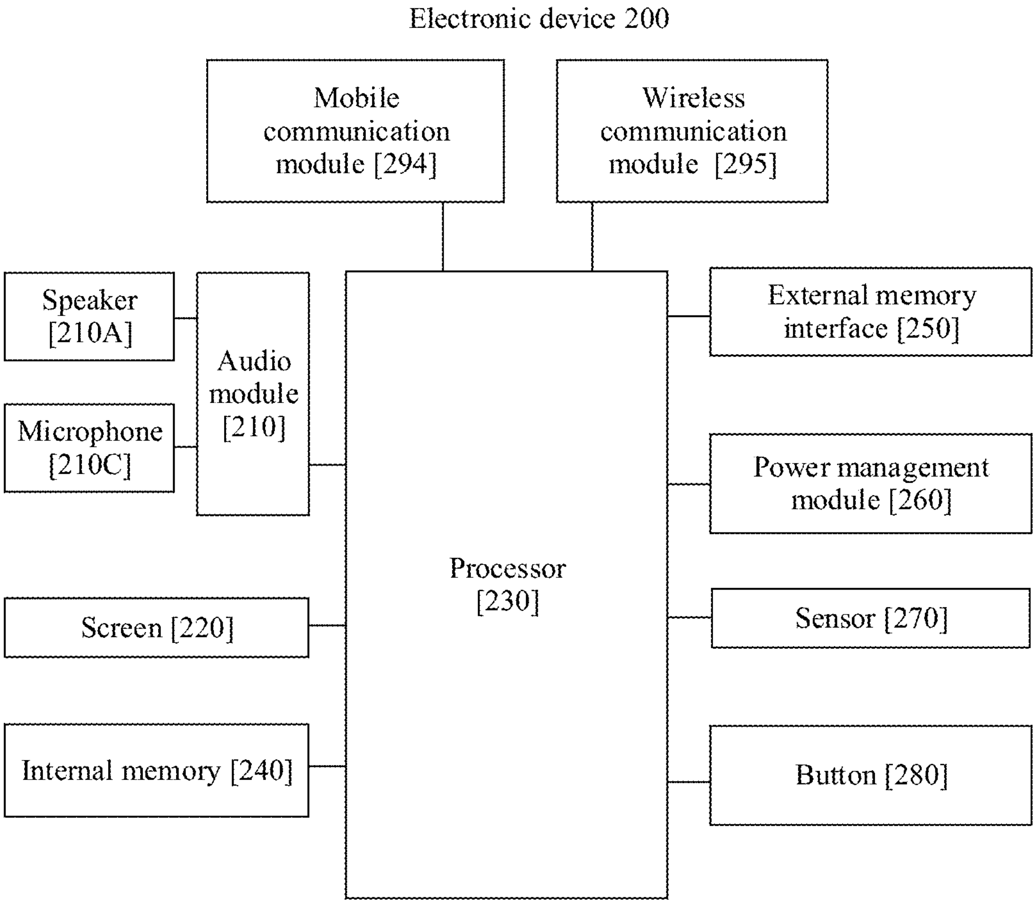
FIG. 2 is a schematic diagram of a hardware structure of an electronic device according to an embodiment of this application.

FIG. 2 is a schematic diagram of a structure of an electronic device 200 applicable to an embodiment of this application.

As shown in FIG. 2, the electronic device 200 may include: an audio module 210, a speaker 210A, a microphone 210C, a screen 220, a processor 230, an internal memory 240, an external memory interface 250, a power management module 260, a sensor 270, a button 280, an antenna 1, an antenna 2, and a mobile communication module 294, a wireless communication module 295, and the like.

The electronic device 200 may implement an audio function by using the audio module 210, the speaker 210A, a receiver 210B, the microphone 210C, a headset interface 110D, an application processor, and the like. In this embodiment of this application, the electronic device 200 may prompt, by using the speaker 210A, map information in a map application to a user in a voice manner.

The audio module 210 is configured to convert digital audio information into an analog audio signal for output, and is also configured to convert analog audio input into a digital audio signal. The audio module 210 may be further configured to encode and decode an audio signal. In some embodiments, the audio module 210 may be disposed in the processor 230, or some functional modules in the audio module 210 are disposed in the processor 230.

The speaker 210A, also referred to as a "loudspeaker", is configured to convert an audio electrical signal into a sound signal.

The microphone 210C, also referred to as a "mike" or a "mic", is configured to convert a sound signal into an electrical signal.

The screen 220 may be a touchscreen formed by a touch sensor and a display, which is also referred to as a "touch screen", and is configured to detect a gesture operation performed on or near the touchscreen. The screen 220 may transfer a detected gesture operation to the processor 230, to determine a type of the gesture operation. In this embodiment of this application, the screen 220 is configured to display a display interface of the map application.

The processor 230 may include one or more processing units. For example, the processor 230 may include an application processor (AP), a modem processor, a graphics processing unit (GPU), an image signal processor (ISP), a controller, a video codec, a digital signal processor (DSP), a baseband processor, and/or a neural-network processing unit (NPU), and the like. Different processing units may be independent components, or may be integrated into one or more processors.

The internal memory 240 may be configured to store computer-executable program code. The computer-executable program code includes instructions. The internal memory 240 may include a program storage area and a data storage area. The processor 230 runs the instructions stored in the internal memory 240 and/or instructions stored in a memory disposed in the processor, to perform various function applications of the electronic device 200 and data processing. In this embodiment of the present disclosure, the internal memory 240 may be configured to store the map information of the map application in this embodiment of this application.

The external memory interface 250 may be configured to connect to an external storage card, for example, a Micro SD card, to extend a storage capability of the electronic device 200. The external storage card communicates with the processor 230 through the external memory interface 250, to implement a data storage function. For example, files such as music and videos are stored in the external storage card.

The power management module 260 is configured to perform power input to the electronic device 200 from a power supply device of a vehicle 100.

The sensor 270 may include a position sensor (for example, GPS (Global Positioning System), global positioning system), an inertial measurement unit (IMU), a radar sensor, a light detection and ranging (LIDAR) sensor, an image sensor, a mileage sensor, a temperature/humidity sensor, an infrared sensor, an atmospheric pressure sensor, a proximity sensor, an illumination sensor, a magnetic sensor, an acceleration sensor, or a gyroscope sensor.

The button 280 includes a power button, a volume button, and the like. The button 280 may be a mechanical button, or may be a touch button. The electronic device 200 may receive a button input, and generate a button signal input related to a user setting and function control of the electronic device 200.

A wireless communication function of the electronic device 200 may be implemented by using the antenna 1, the antenna 2, the mobile communication module 294, the wireless communication module 295, the modem processor, the baseband processor, and the like. The antenna 1 and the antenna 2 are configured to transmit and receive an electromagnetic wave signal.

The mobile communication module 294 may provide a wireless communication solution that includes 2G/3G/4G/5G or the like and that is applied to the electronic device 200.

The wireless communication module 295 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 200. The wireless communication module 295 receives an electromagnetic wave through the antenna 2, performs frequency modulation and screening processing on an electromagnetic wave signal, and sends a processed signal to the processor 230.

Figure 3:
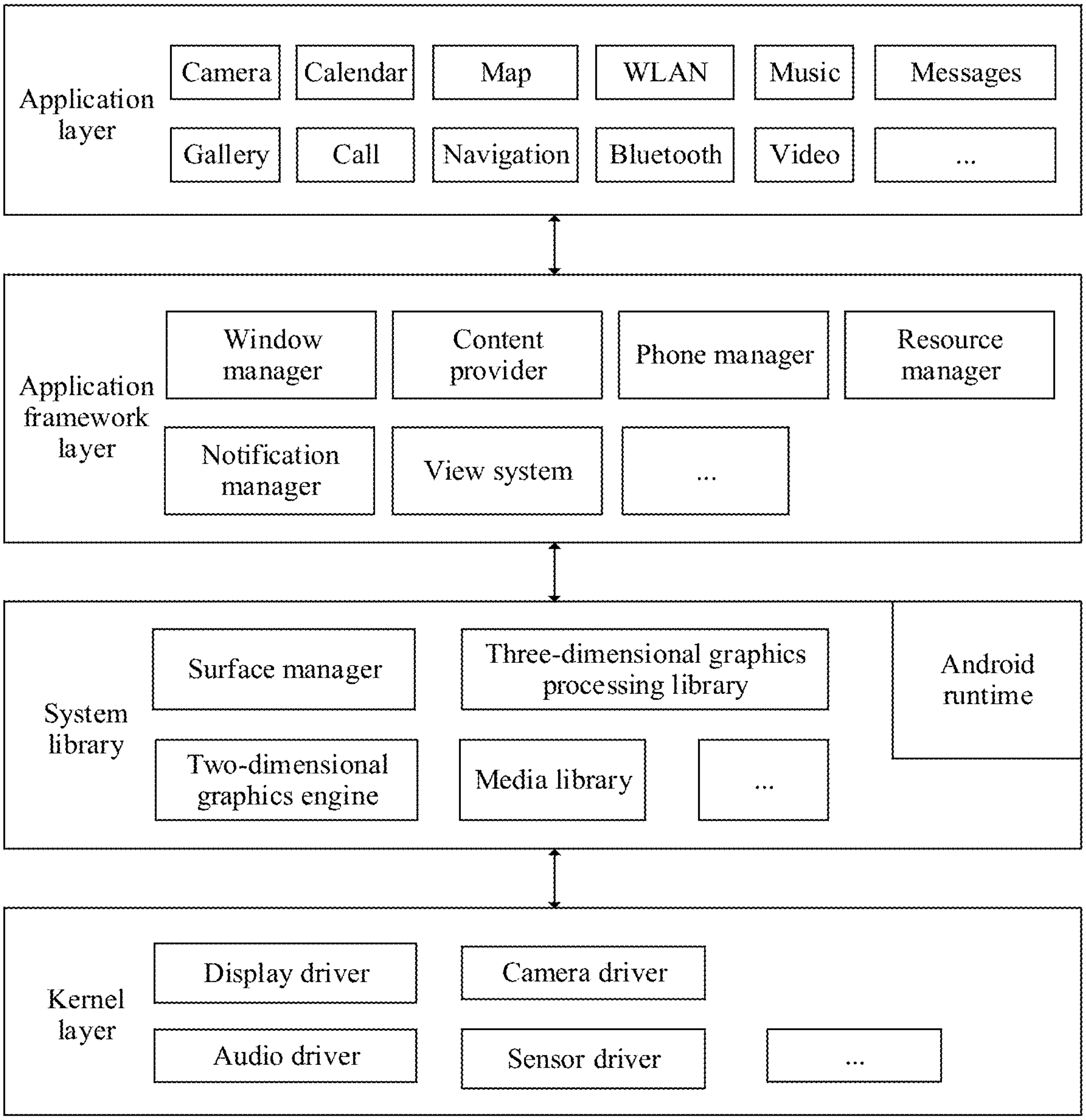
FIG. 3 is a schematic diagram of a software structure of an electronic device according to an embodiment of this application.

FIG. 3 is a block diagram of a software structure of an electronic device 200 according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 3, the application packages may include applications such as a camera, a gallery, a calendar, a call, a map, navigation, WLAN, Bluetooth, music, a video, and Messages. In this embodiment of this application, the navigation application may be a map application. The navigation application includes a map unit and a screening unit, and the map unit stores a map. The map may be updated by using a server 300, or may be synchronized to the server 300 after an electronic device 200 updates the map. The screening unit is configured to screen map information around a vehicle 100 based on a driving route of the vehicle 100, to screen out map information corresponding to the driving route.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, dialed and answered calls, a browsing history, a bookmark, an address book, and the like.

The view system includes visual controls such as a control for displaying text and a control for displaying an image. The view system may be configured to construct an application. A display interface may include one or more views. For example, a display interface including a notification icon of Messages may include a text display view and an image display view.

The phone manager is configured to provide a communication function of the electronic device 200, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction.

The Android runtime includes a kernel library and a virtual machine. The Android runtime is responsible for scheduling and management of the Android system.

The kernel library includes two parts: a function that needs to be called in java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 4:
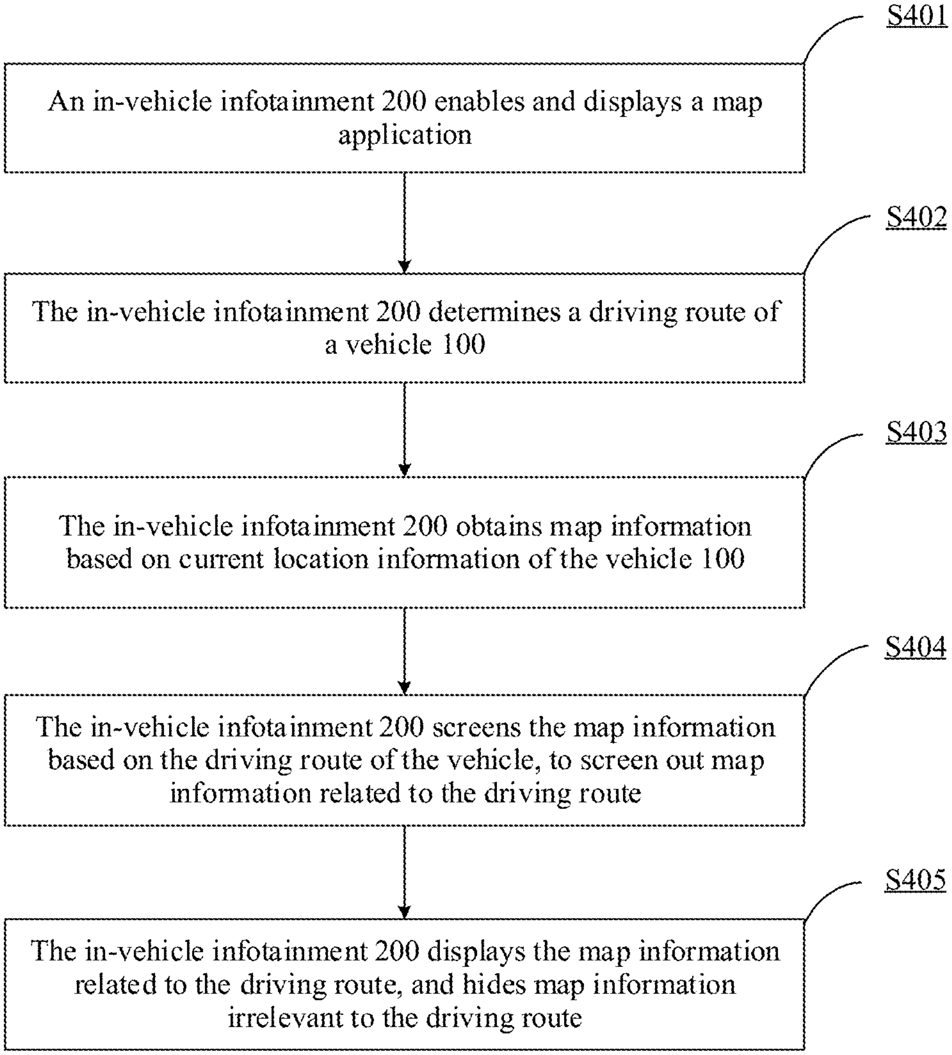
FIG. 4 is a schematic flowchart of a map information display method performed by an electronic device according to an embodiment of this application.

Based on the software and hardware structures of the electronic device 200 shown in FIG. 2 and FIG. 3, the following describes in detail a map information display method for the electronic device 200 in this application by using FIG. 4. The following uses an example in which the electronic device 200 is an in-vehicle infotainment for description.

In one embodiment, the map information display method in FIG. 4 in this application may be implemented by executing a related program by a processor 230 of the in-vehicle infotainment 200. As shown in FIG. 4, the map information display method for the in-vehicle infotainment 200 provided in an implementation of this application includes the following operations.

S401: The in-vehicle infotainment 200 enables and displays a map application.

In this embodiment of this application, the map application may be an application installed on the in-vehicle infotainment 200. After enabling the map application, the in-vehicle infotainment 200 displays a display interface of the map application on a screen of the in-vehicle infotainment 200. The display interface of the map application may include map information, a driving route of a vehicle 100, and current location information of the vehicle 100.

In this embodiment of this application, the map application may include a map, for example, a high-precision map. The map may display map information, for example, road information, traffic sign information, and fixed object information. The road information may be lane information on the map, for example, a location, a type, a width, a slope, and a curvature of a lane. The traffic sign information may be information related to vehicle driving, for example, a traffic sign and a traffic light. The fixed object information may be a fixed object around a lane, for example, information such as a roadside landmark, a parking lot, and a gas station.

In this embodiment of this application, the map application of the in-vehicle infotainment 200 may download a map from a map service of a server 300, and store the map in a storage area of the in-vehicle infotainment 200. After the in-vehicle infotainment 200 enables the map application, the in-vehicle infotainment 200 may load the map from the storage area, to obtain map information included in the map. In another embodiment of this application, the map application of the in-vehicle infotainment 200 may alternatively download a map from the map service of the server 300 in real time, obtain map information included in the map, and display the map information on the display interface of the map application.

S402: The in-vehicle infotainment 200 determines the driving route of the vehicle 100.

In this embodiment of this application, the driving route of the vehicle 100 may be a route that the vehicle 100 needs to pass through when the vehicle 100 travels from a current location to a next location. When the vehicle 100 is in a navigation mode/non-navigation mode, the in-vehicle infotainment 200 may determine the driving route of the vehicle 100 in different manners.

In this embodiment of this application, the map application of the in-vehicle infotainment 200 may run in an NCA (Navigation Cruise Assist, automatic navigation cruise assist) mode, and the NCA mode may be the navigation mode. In the NCA mode, if the vehicle 100 is in a driving process, the in-vehicle infotainment 200 may directly obtain the driving route of the vehicle 100 by using the map application of the in-vehicle infotainment 200. For example, after a user enters a destination into the map application of the in-vehicle infotainment 200, the map application of the in-vehicle infotainment 200 may determine that a route between the current location of the vehicle 100 and the destination is the driving route. After confirming the driving route of the vehicle 100, the in-vehicle infotainment 200 may perform operations S402 to S405 in the driving process of the vehicle 100 based on the determined driving route. Fixed object information corresponding to the driving route of the vehicle 100 is screened out from fixed object information (identified fixed object information near the current location of the vehicle 100), and the fixed object information is displayed on the screen of the in-vehicle infotainment 200.

In this embodiment of this application, if the map application of the in-vehicle infotainment 200 does not enable the navigation mode, the in-vehicle infotainment 200 may determine the driving route of the vehicle 100 by using the following method. The in-vehicle infotainment 200 may determine the driving route of the vehicle 100 based on current lane information of the vehicle 100. For example, the in-vehicle infotainment 200 may determine, based on a lane in which the vehicle 100 is currently located, that a route from the current location of the vehicle 100 to a next intersection corresponding to the lane in which the vehicle 100 is currently located is the driving route of the vehicle 100. When the vehicle 100 arrives at the next intersection corresponding to the lane in which the vehicle 100 is currently located, a lane that is to be entered by the vehicle 100 at a next intersection is obtained, and it is determined that a route from a current location of the lane in which the vehicle 100 enters to a location of a next intersection corresponding to the lane in which the vehicle 100 enters is the driving route of the vehicle 100.

Figure 5:
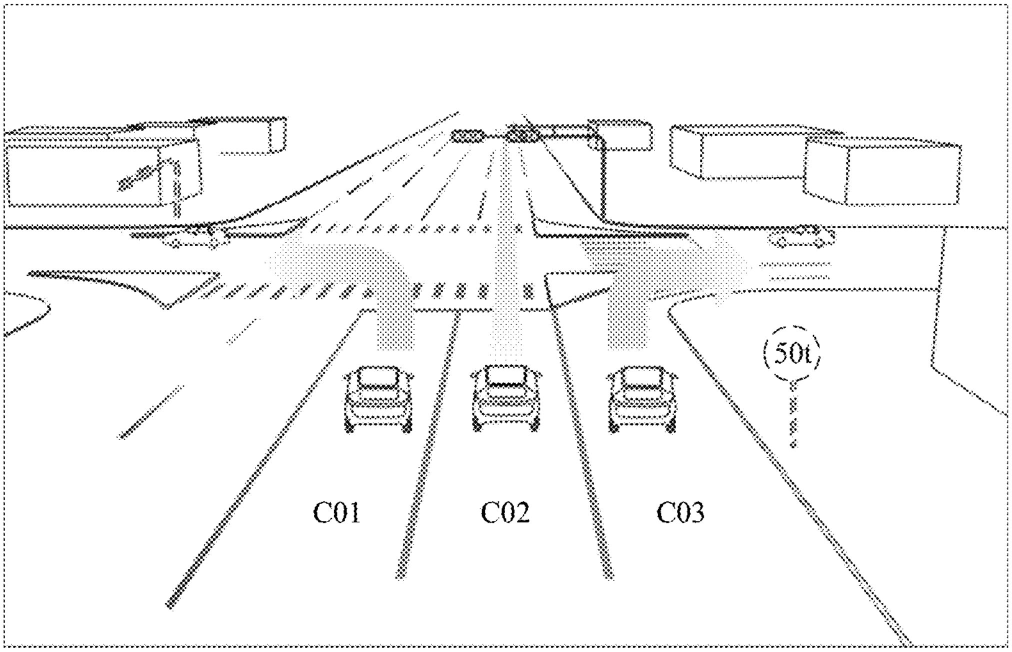
FIG. 5 is a schematic diagram of a scenario in which an electronic device displays map information according to an embodiment of this application.

In this embodiment of this application, the in-vehicle infotainment 200 may further predict, based on the lane in which the vehicle 100 is located, a lane that the vehicle enters at a next intersection. FIG. 5 is a schematic diagram of determining the driving route of the vehicle 100 according to an embodiment of this application. In FIG. 5, if the lane in which the vehicle 100 is located is a straight lane C02, the lane that the vehicle enters at the next intersection is a straight lane in front of the next intersection. If the lane in which the vehicle 100 is located is a turning lane C01 or C03, the lane that the vehicle enters at the next intersection is a lane to which a turning direction of the lane in which the vehicle 100 is located points. If the lane in which the vehicle 100 is located is a multiplexed lane (for example, multiplexed when going straight and turning), the lane that the vehicle enters at the next intersection includes a straight lane and a lane to which a turning direction points (the road that the user enters is determined by combining parking information and traffic signal information of the intersection later, and the road that the user enters is updated again).

It may be understood that, in this embodiment of this application, if the vehicle 100 changes a lane, the in-vehicle infotainment 200 may further re-predict, based on a changed lane, the lane that the vehicle 100 enters at the next intersection.

S403: The electronic device 200 obtains the map information based on the current location information of the vehicle 100.

In this embodiment of this application, the in-vehicle infotainment 200 may determine the current location information of the vehicle 100 based on GPS positioning information, and the GPS positioning information may be generated by a GPS positioning module in the in-vehicle infotainment 200. For example, the in-vehicle infotainment 200 may send the GPS positioning information obtained in real time to a map application service. Correspondingly, the map application service may also locate the vehicle 100 in real time, to determine the current location information of the vehicle 100, and send the current location information of the vehicle 100 to the in-vehicle infotainment 200.

In this embodiment of this application, after the in-vehicle infotainment 200 determines the current location information of the vehicle 100, the map application of the in-vehicle infotainment 200 may obtain, from the map of the map application based on the current location information of the vehicle 100, the map information corresponding to the current location information of the vehicle 100. The map information includes traffic sign information and fixed object information around the current location. The traffic sign information indicates a traffic passing signal, for example, an electronic camera, a speed limit sign, and a traffic light. The fixed object information is usually information about buildings, such as a gas station, a bank/ATM, and a parking lot.

In this embodiment of this application, the map information corresponding to the current location information of the vehicle 100 may be map information within a range formed by using the current location of the vehicle 100 as a center, for example, map information within a 200-meter range by using the current location of the vehicle 100 as the center. The map information corresponding to the current location information of the vehicle 100 may alternatively be map information included in a range corresponding to a current display interface of the map application displayed on the screen of the in-vehicle infotainment 200. It may be understood that, as the vehicle 100 continues to travel, the current location of the vehicle 100 changes, and the map information included in the current display interface of the map application displayed on the screen of the in-vehicle infotainment 200 also changes in real time as the current location of the vehicle 100 changes.

In this embodiment of this application, the in-vehicle infotainment 200 may further directly obtain the traffic sign information in the map information corresponding to the current location information of the vehicle 100, for example, an electronic camera, a speed limit sign, and a traffic light, and ignores non-traffic sign information in the map information, for example, a gas station, a bank/ATM, and a parking lot.

S404: The in-vehicle infotainment 200 screens the map information based on the driving route of the vehicle, to screen out map information related to the driving route.

After the in-vehicle infotainment 200 obtains map information around the vehicle 100, or after the in-vehicle infotainment 200 obtains traffic sign information around the vehicle 100, the in-vehicle infotainment 200 may screen the map information/traffic sign information to obtain traffic sign information related to the driving route of the vehicle 100.

When the in-vehicle infotainment 200 determines the driving route of the vehicle 100, the driving route of the vehicle 100 includes information about a road section on which the vehicle 100 is to travel and information about an extension direction of the road section. Therefore, when the map information related to the driving route is screened, screening may be performed based on at least one of the information about the road section on which the vehicle 100 is to travel and the information about the extension direction of the road section. After the map information is screened based on the information about the road section on which the vehicle 100 is to travel, map information of the road section on which the vehicle 100 is to travel may be obtained, and map information of another irrelevant road is removed. During screening based on the information about the extension direction of the road section, map information that is actually useful for the vehicle 100, in other words, map information (which may also be referred to as front map information of the vehicle 100) of a road that is located in a driving direction of the vehicle 100 and that the vehicle 100 has not traveled may be obtained. For example, it is assumed that there are four traffic lights at an intersection. After screening is performed based on the extension direction of the road section, only a traffic light that provides an indication to the vehicle 100 when the vehicle 100 passes through the intersection may be retained, and other three traffic lights may be hidden.

Figure 6A:
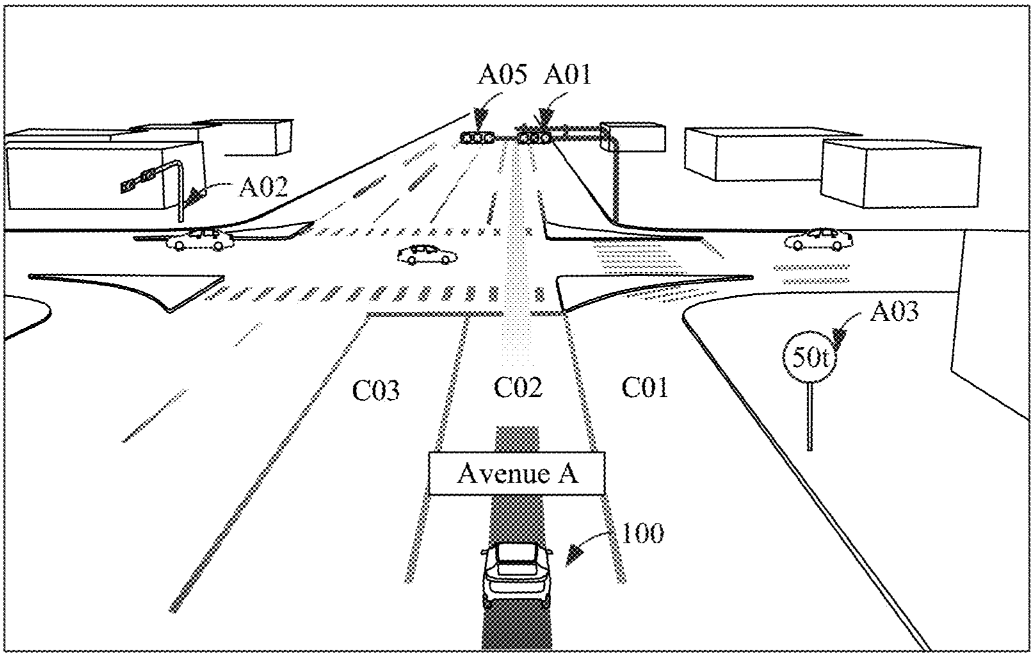
FIG. 6*a* to FIG. 6*c* are schematic diagrams of scenarios in which an electronic device screens map information and displays screened map information according to an embodiment of this application.
Figure 6B:
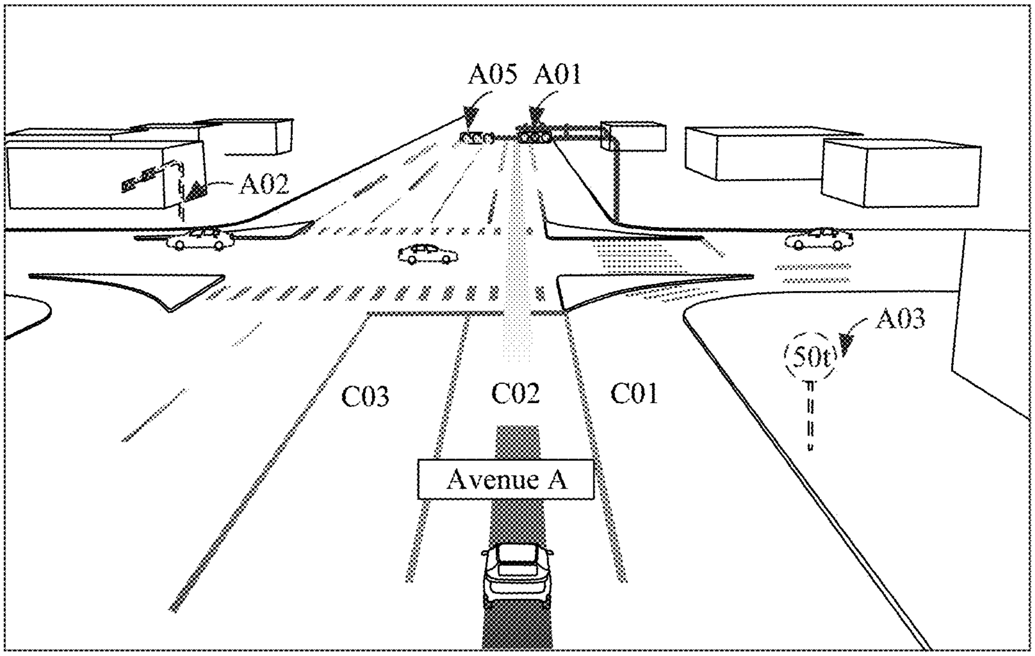
Figure 6C:
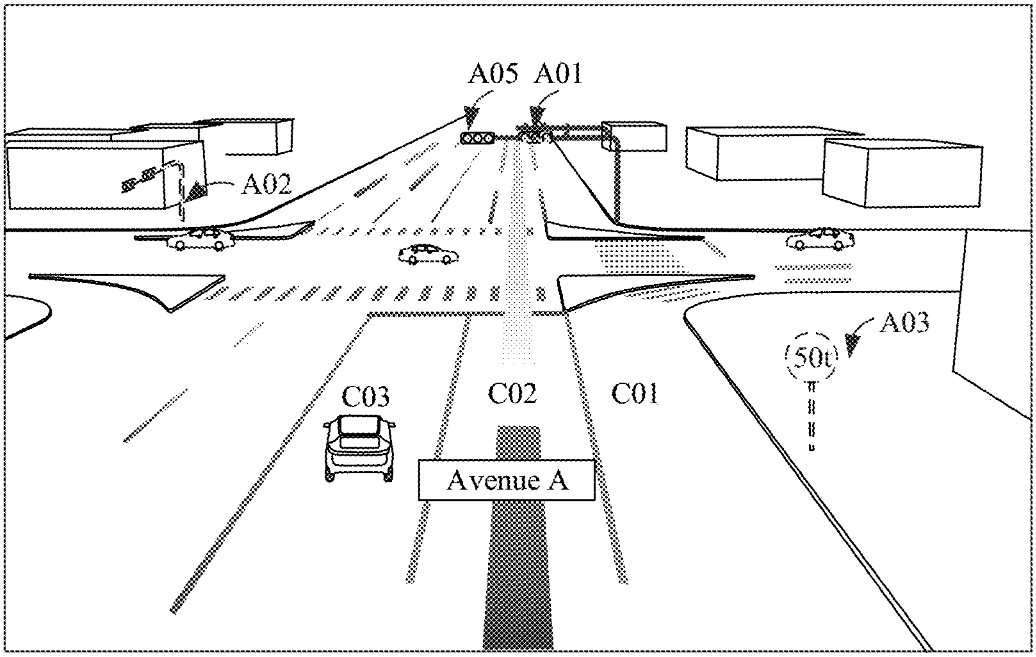

FIG. 6*a* to FIG. 6*c* are diagrams of scenarios in which the in-vehicle infotainment 200 determines and screens the map information around the vehicle 100 according to an embodiment of this application. It is assumed that the vehicle 100 travels along an avenue A based on navigation information. As shown in FIG. 6*a*, the vehicle 100 goes straight on the avenue A. Information that may be obtained based on the driving route of the vehicle 100 is as follows: The vehicle 100 travels on the avenue A in a future time period, and the driving direction is to go straight along a driving direction of the vehicle 100 in FIG. 6*a*. If the map information is screened based on the information about the road section on which the vehicle 100 is to travel, in other words, map information about the avenue A and both sides of the avenue A is screened out. Traffic lights A01, A02, A05, and a weight limit sign A03 are on both sides of the avenue A, and therefore all meet a screening condition. The traffic light A01 indicates the vehicle 100 driving on the avenue A to go straight, and the traffic light A05 indicates to turn left. When screening is performed based on the information about the extension direction of the road section, in one embodiment, when a traffic sign providing an indication for a forward direction of the vehicle 100 is screened out, that is, the vehicle 100 goes straight along the avenue A, a traffic light A02 cannot provide the indication for the forward direction (straight direction) of the vehicle 100. Therefore, the traffic light A02 does not meet a screening condition, while the traffic light A01, the traffic light A05, and the weight limit sign A03 meet the screening condition.

In some embodiments, the driving route of the vehicle 100 may be further accurate to a lane in which the vehicle 100 travels, and further screening may be performed on the traffic sign information based on the lane, to obtain map information that provides traffic guidance for the lane. For example, it is assumed that the avenue A includes the lane C01 to the lane C03, a vehicle on the lane C01 may turn, and a turning mark is included in a middle of a two-way lane of the road. When screening is performed based on the information about the road section that the vehicle 100 is to travel and screening is performed based on the information about the extension direction of the road section, the turning mark meets a condition. However, the turning mark is not applicable to the driving lane C02 of the vehicle 100, but is applicable to the lane C01. Therefore, the turning mark may be screened out and hidden through lane-level screening.

In this embodiment of this application, the in-vehicle infotainment 200 may separately screen the traffic sign information based on the lane, the driving direction, and the driving speed included in the driving route. The foregoing process may include: The in-vehicle infotainment 200 may first determine, based on the current location information of the vehicle 100, the lane in which the vehicle 100 is located, display traffic sign information corresponding to the lane, and hide traffic sign information corresponding to another lane. (For example, a speed limit sign corresponding to the lane is displayed). It may be understood that, because the driving direction of the vehicle 100 has not been determined, the in-vehicle infotainment 200 may display a traffic light at an intersection on the display interface of the map application. After the traffic sign information is screened based on the lane, the in-vehicle infotainment 200 may further screen and display traffic sign information corresponding to the driving direction of the vehicle 100. (For example, traffic sign information in front of the vehicle 100 is displayed, and traffic sign information behind the vehicle 100 is hidden. For the traffic light, the in-vehicle infotainment 200 may display only a traffic light that provides a signal indication for the lane in which the vehicle 100 is located). For a traffic signal sign corresponding to the driving speed of the vehicle 100, for example, a speed limit sign, if the speed limit sign does not limit the lane in which the vehicle 100 is located, the in-vehicle infotainment 200 may not display the speed limit sign, and if the speed limit sign limits the lane in which the vehicle 100 is located or limits the entire road, the in-vehicle infotainment 200 may display the speed limit sign.

In this embodiment of this application, there is no limitation that the in-vehicle infotainment 200 needs to sequentially screen the traffic sign information in an order of the lane, the driving direction, and the driving speed included in the driving route. The in-vehicle infotainment 200 may screen the traffic sign information in any order of the driving direction, the lane, and the driving speed. In another embodiment of this application, the in-vehicle infotainment 200 may further perform screening on the traffic sign information based on the driving direction, the lane, and the driving speed simultaneously.

Still refer to FIG. 6*a*. The in-vehicle infotainment 200 may determine the map information around the vehicle 100 based on the current location of the vehicle 100, for example, the traffic lights A01, A02, and A05, and the weight limit sign A03. The in-vehicle infotainment 200 may determine the lane included in the driving route of the vehicle 100, for example, the lane C02. The in-vehicle infotainment 200 may perform screening on the map information based on the lane C02 to screen out the traffic light A01. It can be learned that, although the weight limit sign A03 restricts the entire road, the weight limit sign A03 is traffic sign information irrelevant to the driving speed, and the in-vehicle infotainment 200 may exclude the weight limit sign A03. In the scenario in FIG. 6*a*, the in-vehicle infotainment 200 may determine the driving direction of the vehicle 100 based on the lane C02 where the vehicle 100 is located, and determine that the vehicle 100 is still on a straight path after passing the next intersection. The in-vehicle infotainment 200 may determine that the traffic light A01 is related to the driving direction of the vehicle 100, the traffic light A02 is irrelevant to the driving direction of the vehicle 100, and the traffic light A05 indicates the vehicle 100 travels on the lane C01 to turn left. Therefore, the in-vehicle infotainment 200 excludes the traffic light A02 and the traffic light A05.

In this embodiment of this application, as shown in FIG. 6*a*, when the in-vehicle infotainment 200 determines that the vehicle 100 is a car, the in-vehicle infotainment 200 may further determine that the weight limit sign A03 is irrelevant to the driving route of the vehicle 100, and is excluded. Only the traffic light A01 conforms to the driving route of the vehicle 100.

In this embodiment of this application, the in-vehicle infotainment 200 may further screen the map information based on the driving direction of the vehicle 100 and whether the map information is map information related to the driving speed. The driving direction herein may be a direction of the driving route of the vehicle 100, and whether the map information is the map information related to the driving speed may be whether content identified from the map information relates to the speed of the vehicle 100, for example, the speed limit sign.

S405: The in-vehicle infotainment 200 displays the map information related to the driving route, and hides map information irrelevant to the driving route.

In this embodiment of this application, after the in-vehicle infotainment 200 screens out the map information related to the driving route, the in-vehicle infotainment 200 displays the map information related to the driving route to the user, and hides the map information irrelevant to the driving route.

As shown in FIG. 6*b*, after the in-vehicle infotainment 200 screens the map information in operation S404, only the traffic light A01 is displayed on the screen of the in-vehicle infotainment 200 for the user. For the traffic light A02, the traffic light A02 is irrelevant to a road in which the vehicle 100 travels and the driving direction, and the in-vehicle infotainment 200 hides the traffic light A02. For the traffic light A05, the traffic light A05 indicates the vehicle 100 that travels on the lane C03 to turn left, and is irrelevant to the vehicle 100 that travels on the lane C02, and the in-vehicle infotainment 200 hides the traffic light A05. For the weight limit sign A03, the weight limit sign A03 is not the map information related to the driving speed of the vehicle 100, and the in-vehicle infotainment 200 also hides the weight limit sign A03 (the traffic light A02, the weight limit sign A03, and the traffic light A05 in FIG. 6*b* are represented by dotted lines).

For the scenario shown in FIG. 6*b*, a display location of the traffic light A01 on the display interface of the map application on the screen of the in-vehicle infotainment 200 may be consistent with a location of the traffic light A01 in a physical environment. When the map included in the map application is a 3D high-precision map, the traffic light A01 may be displayed as a mark of a 3D model. For the traffic light A02, the traffic light A05, and the weight limit sign A03 that are hidden, marks of 3D models of the traffic light A02, the traffic light A05, and the weight limit sign A03 are hidden on the display interface of the map application on the screen of the in-vehicle infotainment 200. The screen of the in-vehicle infotainment 200 may alternatively be a human machine interface (HMI).

In another embodiment of this application, when the vehicle 100 changes a driving route, for example, the vehicle 100 changes a driving lane, the in-vehicle infotainment 200 may update displayed map information in real time based on a changed driving route of the vehicle 100. As shown in FIG. 6*c*, the vehicle 100 travels from the lane C02 to the lane C03 and is ready to turn left. In this case, the in-vehicle infotainment 100 may screen the displayed map information again based on the driving route (the lane C03) of the vehicle 100. The map information displayed on the screen of the in-vehicle infotainment 200 changes to the traffic light A05. The in-vehicle infotainment 200 hides the traffic light A02 that is irrelevant to the road in which the vehicle 100 travels and the driving direction, hides the traffic light A01 that indicates the vehicle 100 that travels on the lane C02 to go straight, and hides the weight limit sign A03 (the traffic light A02, the weight limit sign A03 and the traffic light A01 in FIG. 6*c* are represented by dotted lines).

Figure 7A:
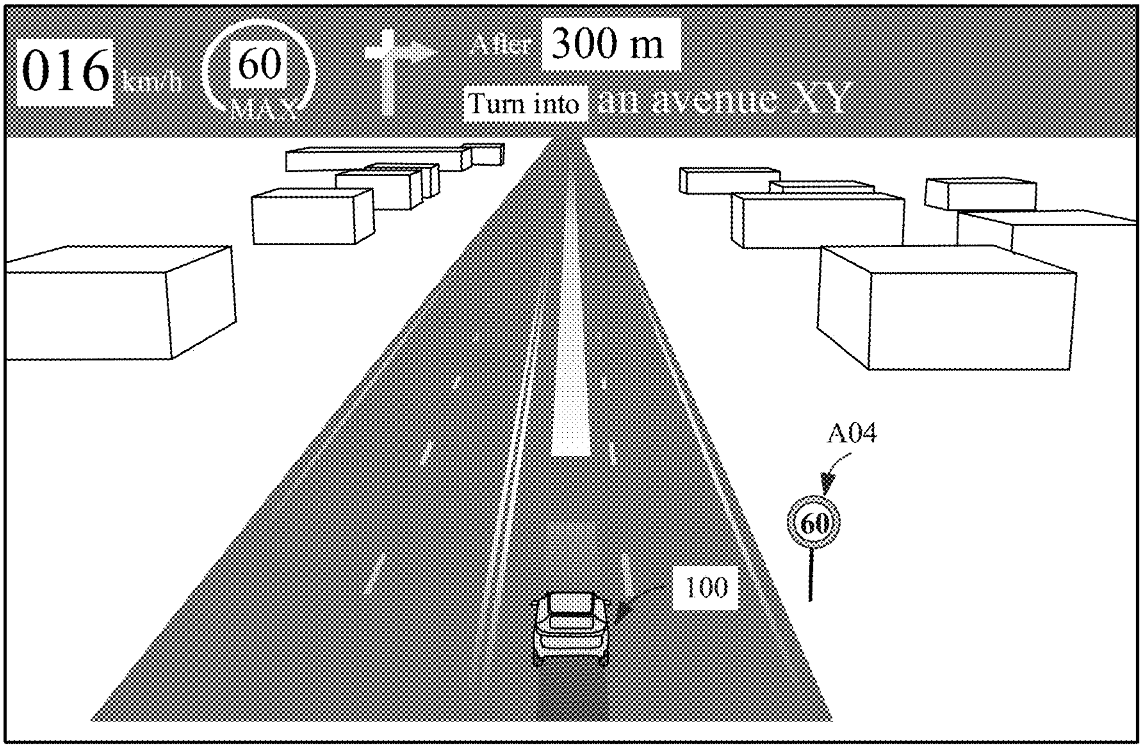
FIG. 7*a* and FIG. 7*b* are schematic diagrams of scenarios in which an electronic device sets a display area used to display map information related to a driving route according to an embodiment of this application.

In this embodiment of this application, the in-vehicle infotainment 200 may further set, on the screen, a display area used to display the map information related to the driving route, and display, in the display area, an icon of the map information related to the driving route, so that the map information may be independent of the map application and does not affect the map application. FIG. 7*a* is a diagram of a scenario in which the in-vehicle infotainment 200 sets, on the screen, the display area used to display the map information related to the driving route. In FIG. 7*a*, there is only a speed limit sign A04 around a current location of the vehicle 100, and there is no other map information related to the driving route. Only a mark of the speed limit sign A04 is displayed on the display interface of the map application on the screen of the in-vehicle infotainment 200. The in-vehicle infotainment 200 displays an icon (60MAX in FIG. 7*a*) of the speed limit sign A04 in the display area of the screen, and hides other map information irrelevant to the driving route. As shown in FIG. 7*a*, the in-vehicle infotainment 200 may further display, in the display area of the screen, other information about driving of the vehicle, such as a vehicle speed (16 km/h in FIG. 7*a*) and a distance (300 m in FIG. 7*a*) between the vehicle 100 and a next intersection determined by the in-vehicle infotainment 200.

Figure 7B:
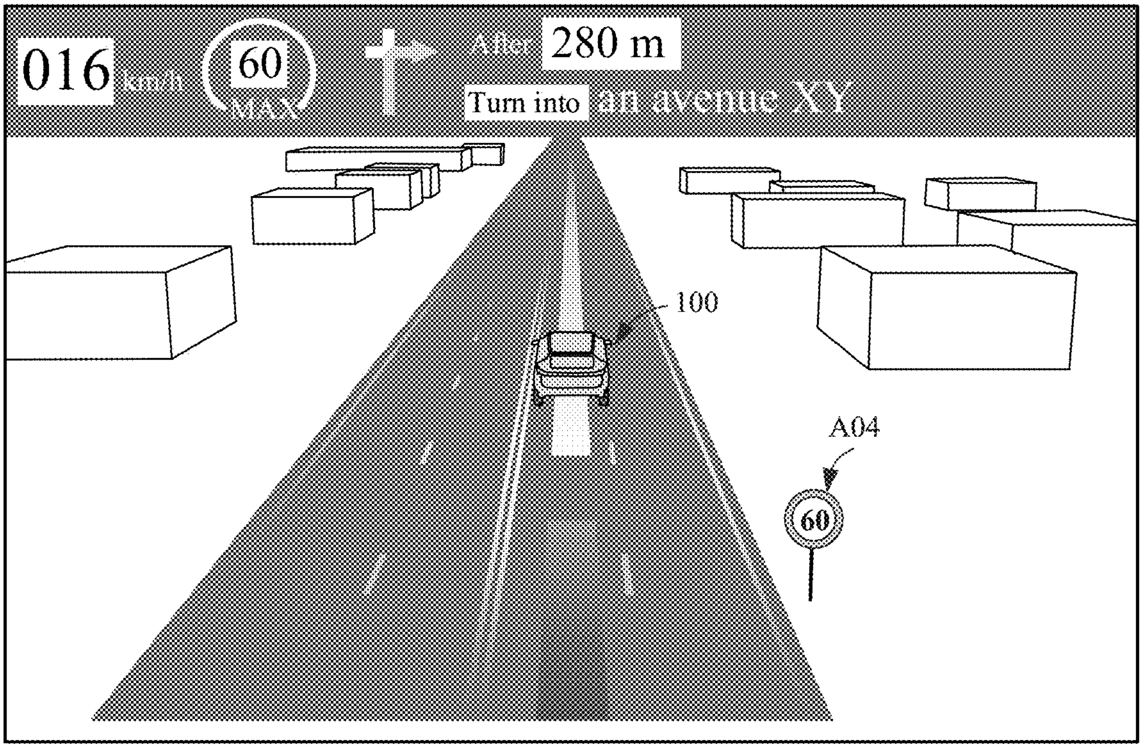

In this embodiment of this application, map information whose application range covers a large area is usually traffic sign information (for example, the speed limit sign A04 in FIG. 7*b*). Even if the vehicle 100 passes a location where the traffic sign information is located, in other words, the traffic sign information is far away from the current location of the vehicle 100, as long as the vehicle 100 is within an effective range of the traffic sign information, the in-vehicle infotainment 200 may still display the traffic sign information in the display area of the screen of the in-vehicle infotainment 200 or a head-up display of the vehicle 100. For the display interface of the map application on the screen of the in-vehicle infotainment 200, the map application is limited by a display range, and only map information around the current location of the vehicle 100 is displayed. Therefore, the display interface of the map application on the screen of the in-vehicle infotainment 200 may not display information about a passed traffic sign. For example, in FIG. 7*b*, after the vehicle 100 passes the speed limit sign A04, the mark of the speed limit sign A04 is no longer displayed on the display interface of the map application on the screen of the in-vehicle infotainment 200. However, the mark of the speed limit sign A04 is still displayed in the display area of the screen of the in-vehicle infotainment 200 or on the head-up display of the vehicle 100 until the vehicle 100 travels out of an effective range of the speed limit sign A04. In another embodiment of this application, as shown in FIG. 7*c*, a speed limit sign A06 appears in front of the driving route of the vehicle 100, in other words, the vehicle 100 has entered an effective range of the speed limit sign A06. In this case, a mark of the speed limit sign A06 is displayed on the display interface of the map application of the screen of the in-vehicle infotainment 200 until the vehicle 100 travels out of the effective range of the speed limit sign A06 or enters an effective range of a next speed limit sign again. It may be understood that, in another embodiment of this application, when the driving route of the vehicle 100 includes the lane C01 and the lane C02, and the lane C01 and the lane C02 are reverse lanes, if the vehicle 100 travels from the lane C01 to the lane C02, the in-vehicle infotainment 200 may display map information of the lane C02 and hide map information of the lane C01.

In some embodiments, a type of a map identifier may be further screened, and only a traffic sign of a direction indication type and a traffic sign of a speed guidance type are retained.

Figure 8:
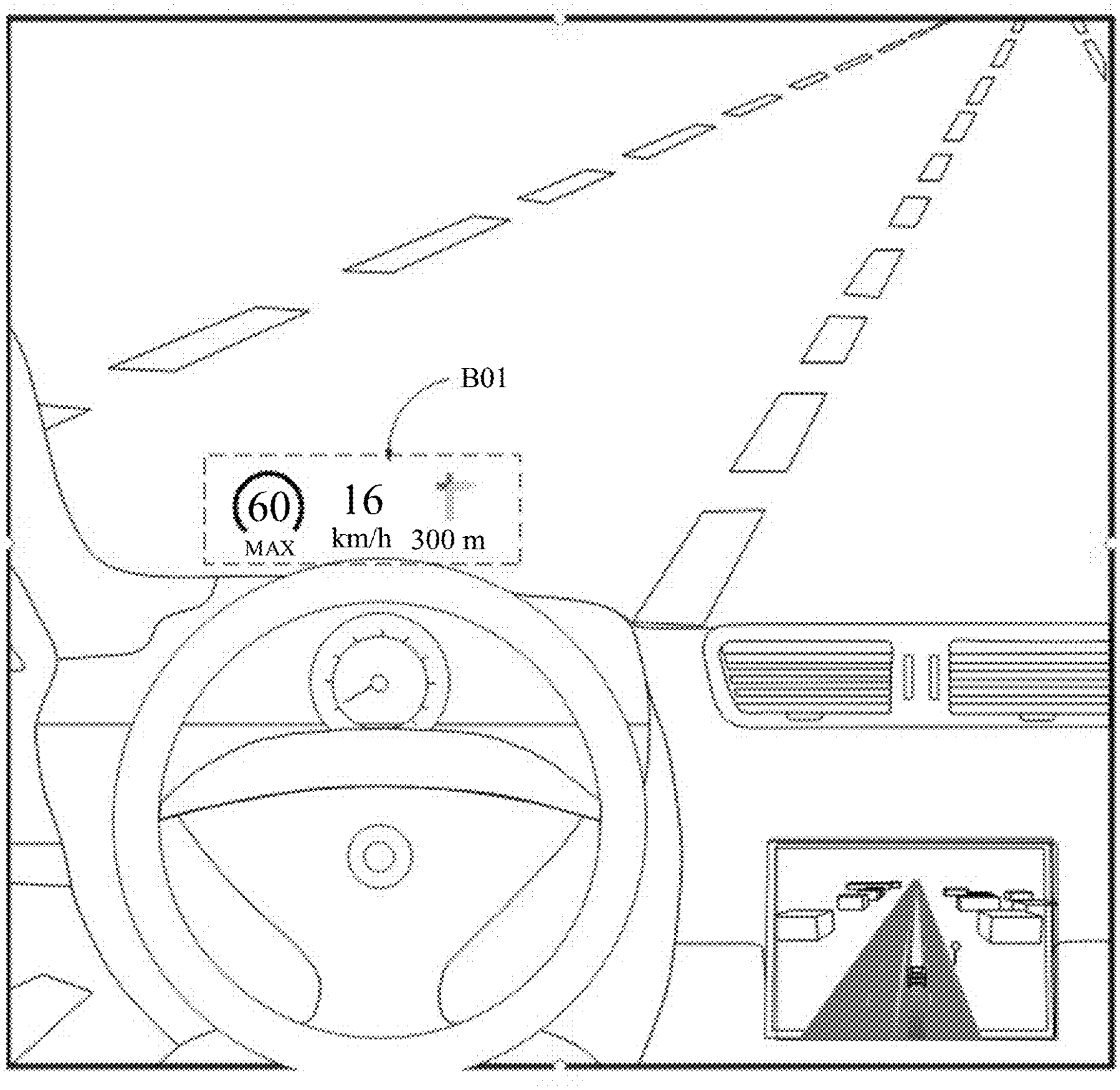
FIG. 8 is a schematic diagram of a scenario in which an electronic device displays map information related to vehicle driving and other information related to vehicle driving according to an embodiment of this application.

In this embodiment of this application, the in-vehicle infotainment 200 may further display, on the head-up display (HUD) of the vehicle 100, the map information related to the driving route, and display, on the head-up display, the icon of the map information related to the driving route, so that the map information may be independent of the map application and does not affect the map application. In addition, the in-vehicle infotainment 200 may also display, on the head-up display, other information about driving of the vehicle, for example, the vehicle speed. FIG. 8 is a diagram of a scenario in which the in-vehicle infotainment 200 displays, on a head-up display B01, map information related to vehicle driving and other information about vehicle driving. The head-up display B01 includes the icon (60MAX in FIG. 8) of the speed limit sign A04, the driving speed information (16 km/h in FIG. 8, a vehicle speed may be detected by a sensor of the vehicle 100) determined by the in-vehicle infotainment 200, and a distance (300 m in FIG. 8) between the vehicle 100 and a next intersection determined by the in-vehicle infotainment 200.

In this embodiment of this application, the in-vehicle infotainment 200 may further retain, in the map application, map information screened out based on the driving route of the vehicle 100. If the vehicle 100 is backed up, the screen of the in-vehicle infotainment 200 or the head-up display may display the screened map information again.

FIG. 4 describes a process of the map information display method for the in-vehicle infotainment 200 in this embodiment of this application. It can be learned that in operation S404 described in FIG. 4, the driving route is a route that the vehicle 100 needs to pass through when the vehicle 100 travels from the current location to the next location. The traffic lights A01, A02 and the weight limit sign A03 described in FIG. 6*a* to FIG. 6*c* are also applicable to the entire road.

In this embodiment of this application, some traffic sign information is applicable to a particular lane. For example, a traffic light is used as an example. One traffic light is disposed on each lane of a road at each moment, and separate signal indication is performed on a lane where each traffic light is located. For example, for a three-lane road, a right-turn traffic light is applicable to a right-turn lane, a straight-going traffic light is applicable to a straight lane, and a left-turn traffic light is applicable to a left-turn lane. Therefore, the in-vehicle infotainment 200 may further perform screening based on a lane corresponding to the driving route of the vehicle 100, to screen out a traffic light and a traffic sign that provide an indication for the lane corresponding to the driving route of the vehicle 100.

In this embodiment of this application, if the vehicle 100 is in a navigation state, in other words, the map application of the in-vehicle infotainment 200 may run in the NCA mode, the in-vehicle infotainment 200 may obtain, by using the map application, the lane corresponding to the driving route of the vehicle 100. If the vehicle 100 switches a lane in the driving process, the in-vehicle infotainment 200 may also obtain, in real time, a lane corresponding to a switched driving route of the vehicle 100.

In this embodiment of this application, if the vehicle 100 is in the navigation state, the in-vehicle infotainment 200 may alternatively determine, by using a lane line recognition method, the lane corresponding to the driving route of the vehicle 100. The in-vehicle infotainment 200 may check a recognized lane and a lane that is obtained by the in-vehicle infotainment 200 by using the map application, to determine whether the vehicle 100 is driving in the navigation lane prompted by the map application. When the in-vehicle infotainment 200 determines that the vehicle 100 is not driving in the navigation lane, the in-vehicle infotainment 200 may screen traffic sign information by determining a lane identified by using the lane line recognition method as the lane corresponding to the driving route of the vehicle 100.

In this embodiment of this application, if the vehicle 100 is not in the navigation state, the in-vehicle infotainment 200 may determine, in real time by using the lane line recognition method, the lane corresponding to the driving route of the vehicle 100, and then screen out, based on the identified lane, traffic sign information applicable to the lane. If the vehicle 100 switches a lane in the driving process, the in-vehicle infotainment 200 may re-identify the lane corresponding to the driving route of the vehicle 100, and re-screen traffic sign information.

Figure 9:
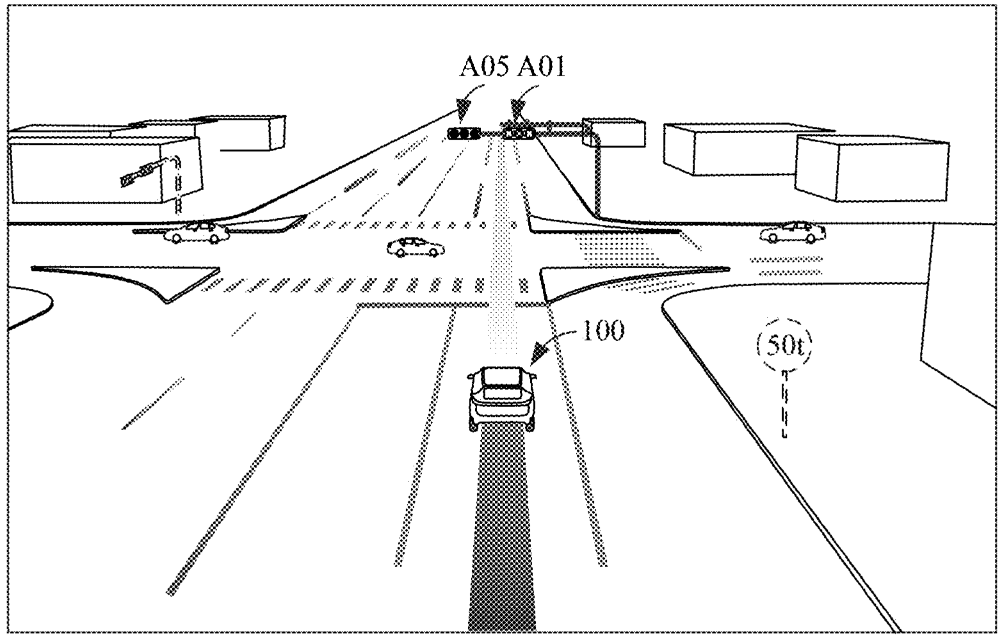
FIG. 9 is a schematic diagram of a scenario in which an electronic device sets a mark on a display interface of a map application to display map information related to a lane corresponding to a driving route according to an embodiment of this application.

FIG. 9 shows that the in-vehicle infotainment 200 may display map information related to the lane corresponding to the driving route and hide map information irrelevant to the driving route by setting a mark on the display interface of the map application displayed on the screen. In FIG. 9, the display interface of the map application displayed on the screen of the in-vehicle infotainment 200 presents only a color change of the traffic light A01 corresponding to the lane corresponding to the driving route of the vehicle 100. A color change of another traffic light (for example, the traffic light A05) corresponding to another lane may be hidden, so as to display lane-level map information. For example, in FIG. 9, the vehicle 100 goes straight on the lane C02, and therefore, the traffic light A01 indicating to go straight has a color change, while the traffic light A05 indicating to turn has no color change (for example, the traffic light A05 is set to always display black).

In this embodiment of this application, the traffic sign, the traffic light, and the like usually have a fixed bearing carrier, for example, a mounting frame of the traffic sign, or a lamp post of the traffic light, and a sensor included in the in-vehicle infotainment 200, for example, a radar sensor, may detect the bearing carrier. In the driving process of the vehicle 100, the in-vehicle infotainment 200 may check locations of the traffic light and the traffic sign by using the sensor. On the one hand, locations of a traffic light and a traffic sign in the map of the map application are consistent with actual locations. On the other hand, if the in-vehicle infotainment 200 detects a traffic light or a traffic sign (for example, a newly added traffic light/traffic sign) that is not in the map of the map application, the traffic light or the traffic sign may be updated to the map of the map application.

In this embodiment of this application, in a check process, if the in-vehicle infotainment 200 detects a traffic light/traffic sign that is not in the map of the map application by using the sensor, the in-vehicle infotainment 200 may perform supplementary modeling on the map of the map application, to add the newly detected traffic light/traffic sign to the map of the map application. To ensure accuracy of the map of the map application, the in-vehicle infotainment 200 may determine, based on at least two/two different sensors, whether the traffic light/traffic sign is detected. For example, the in-vehicle infotainment 200 may confirm the traffic light/traffic sign and a location thereof in combination with image recognition of an image sensor and the radar sensor.

Figure 10A:
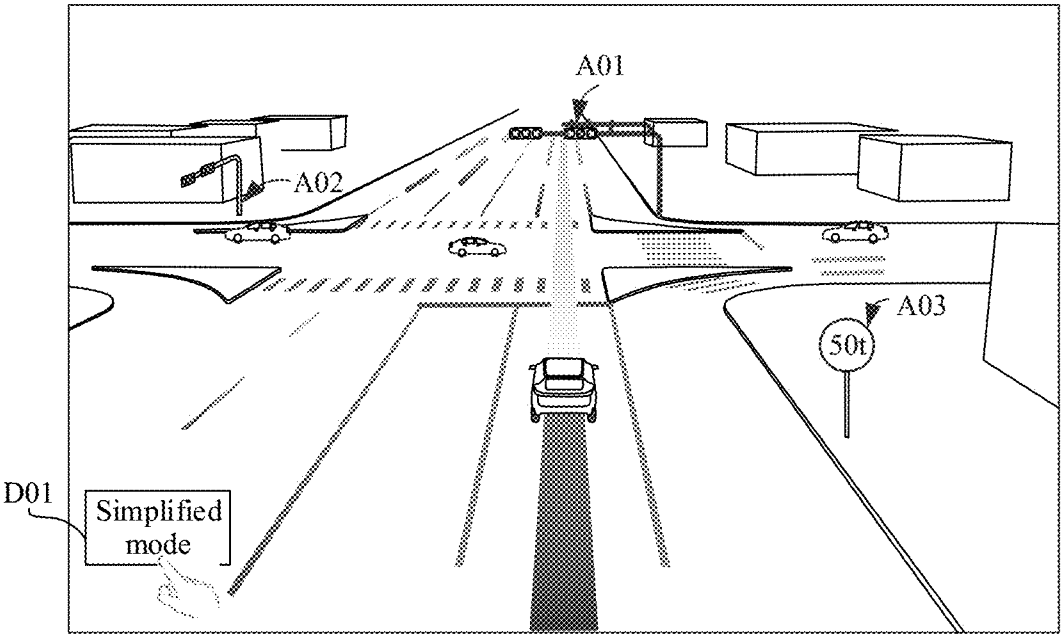
FIG. 10*a* and FIG. 10*b* are schematic diagrams of scenarios in which an electronic device displays map information in a mode switching manner according to an embodiment of this application.
Figure 10B:
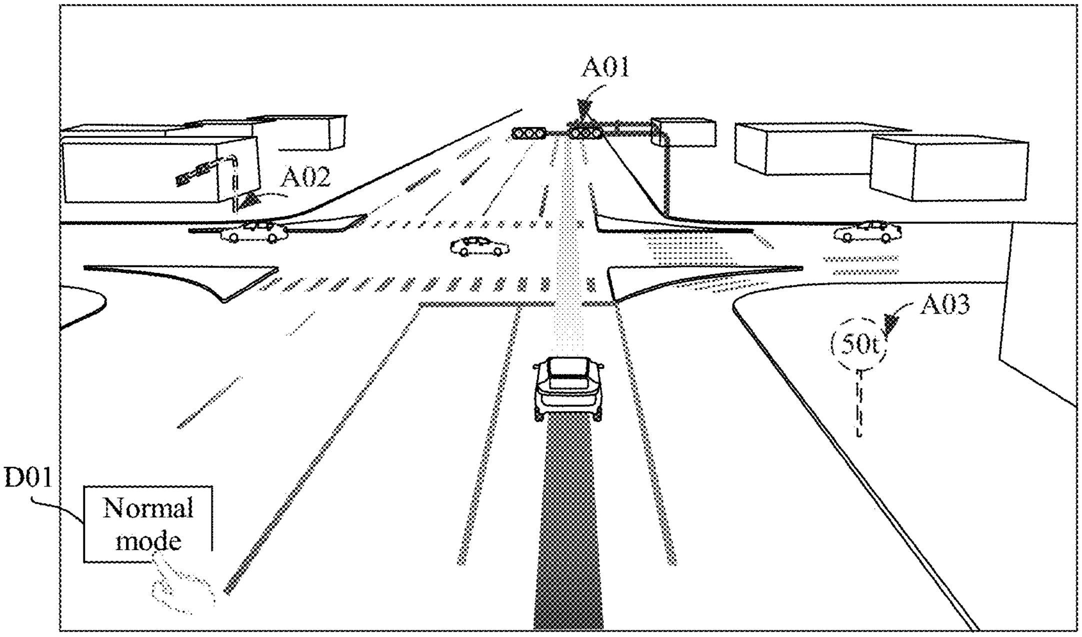

In this embodiment of this application, as shown in FIG. 10*a*, after the in-vehicle infotainment 200 enables the map application, map information corresponding to the current location of the vehicle 100 may be displayed on the display interface of the map application, without screening the map information (the traffic light A01, the traffic light A02 and the weight limit sign A03 in FIG. 10*a* are represented by solid lines). A mode switching button D01 may be set on the display interface of the map application, and the user driving the vehicle 100 may tap the button D01 on the display interface of the map application of the in-vehicle infotainment 200, so that the map application is switched to a simplified mode. The in-vehicle infotainment 200 may screen the map information on the display interface of the map application by using operations S402 to S405 described in FIG. 4. As shown in FIG. 10*b*, the in-vehicle infotainment 200 displays the map information related to the driving route of the vehicle 100, and hides the map information irrelevant to the driving route of the vehicle 100 (the traffic light A01 in FIG. 10*b* is represented by solid lines; and the traffic light A02 and the weight limit sign A03 are represented by dotted lines). After the map application is switched to the simplified mode, the user driving the vehicle 100 may further tap the button D01 on the display interface of the map application of the in-vehicle infotainment 200, so that the map application is switched back to a normal mode.

It should be understood that although terms such as "first" and "second" may be used herein to describe various features, these features should not be limited by these terms. These terms are merely used for distinction, and shall not be understood as an indication or implication of relative importance. For example, without departing from the scope of the example embodiments, a first feature may be referred to as a second feature, and similarly the second feature may be referred to as the first feature.

Furthermore, various operations will be described as a plurality of separate operations in a manner that is most conducive to understanding illustrative embodiments. However, a described sequence should not be construed as implying that these operations need to depend on the described sequence. A plurality of these operations may be performed in parallel, concurrently, or simultaneously. In addition, the sequence of the operations may be further rearranged. The processing may be terminated when the described operations are completed, but may also have additional operations not included in the figures. The processing may correspond to a method, a function, a procedure, a subroutine, a subprogram, or the like.

References to "an embodiment", "embodiments", "an illustrative embodiment", and the like in the specification indicate that the described embodiment may include a particular feature, structure, or property, but each embodiment may or may not necessarily include the particular feature, structure, or property. In addition, these phrases are not necessarily intended for a same embodiment. In addition, when features are described with reference to particular embodiments, knowledge of a person skilled in the art can affect combination of these features with other embodiments, regardless of whether these embodiments are explicitly described.

Unless otherwise stated, terms "contain", "have", and "include" are synonymous. A phrase "A/B" indicates "A or B". The phrase "A and/or B" indicates "(A), (B), or (A and B)".

As used herein, the term "module" may refer to being a part thereof, or include a memory (a shared memory, a dedicated memory, or a group memory) for running one or more software or firmware programs, an application-specific integrated circuit (ASIC), an electronic circuit and/or a processor (a shared processor, a dedicated processor, or a group processor), a combined logic circuit, and/or another proper component that provides the function.

In the accompanying drawings, some structure or method features may be shown in an arrangement and/or order. However, it should be understood that such an arrangement and/or order is not required. In some embodiments, these features may be described in a manner and/or order different from that shown in the descriptive accompanying drawings. In addition, structure or method features included in an accompanying drawing do not mean that all embodiments need to include such features. In some embodiments, these features may not be included, or these features may be combined with other features.

Embodiments of this application are described above in detail with reference to the accompanying drawings. However, use of the technical solutions of this application is not limited to various applications mentioned in embodiments of this application, and various structures and variations may be easily implemented with reference to the technical solutions of this application, to achieve various beneficial effects mentioned in this specification. Without departing from the purpose of this application, any variation made within the scope of knowledge possessed by a person of ordinary skill in the art shall fall within the scope of this application.

What is claimed is:

1. A map display method, applied to an electronic device and comprising:

obtaining a first map, wherein the first map comprises map elements related to a current driving route of a vehicle in which the electronic device is located; and displaying a second map, wherein the second map comprises a first part of the map elements related to the current driving route, and map information irrelevant to the current driving route is hidden.

2. The method according to claim 1, wherein the first part of map elements comprise at least one of the following:

an electronic camera, a road sign, a traffic light, or a speed limit sign.

3. The method according to claim 2, wherein the electronic camera, the road sign, and the traffic light are located in front of the driving route of the vehicle.

4. The method according to claim 3, wherein the speed limit sign is located in front of the driving route of the vehicle or behind the driving route of the vehicle.

5. The method according to claim 4, wherein the current driving route of the vehicle comprises at least a first lane and a second lane.

6. The method according to claim 5, wherein when the vehicle travels in the first lane, displaying at least one of the electronic camera, the road sign, the traffic light, or the speed limit sign included in the first part of map elements and corresponds to the first lane.

7. The method according to claim 5, wherein the method further comprises:

when the vehicle travels from the first lane to the second lane, displaying at least one of the electronic camera, the road sign, the traffic light, or the speed limit sign included in the first part of map elements and corresponds to the second lane; and hiding at least one of the electronic camera, the road sign, the traffic light, or the speed limit sign that corresponds to only the first lane.

8. The method according to claim 1, wherein the obtaining the first map further comprises:

obtaining the first map based on predicted driving information of the vehicle in a preset time period, wherein the preset time period is determined based on at least one of a display refresh frequency of the map or a driving speed of the vehicle.

9. The method according to claim 8, wherein the predicted driving information comprises at least one of the following: the current driving route, a driving direction, or the driving speed of the vehicle.

10. The method according to claim 9, wherein the displaying the second map further comprises:

while displaying the first part of map elements, hiding a second part of the map elements whose element types are different from those of the first part of map elements.

11. The method according to claim 10, wherein the second part of map elements comprise at least one of the following: a building, a weight limit sign, or a road sign.

12. A map display apparatus, used in an electronic device, wherein the display apparatus comprises:

a processor; and a memory to store instructions that, when executed by the processor, cause the processor to:

obtain a first map, wherein the first map comprises map elements related to a current driving route of a vehicle in which the electronic device is located; and display a second map, wherein the second map comprises a first part of the map elements related to the current driving route, and map information irrelevant to the current driving route is hidden, and wherein the first part of map elements comprise at least one of an electronic camera, a road sign, a traffic light, or a speed limit sign.

13. The display apparatus according to claim 12, wherein the processor is further to determine that the electronic camera, the road sign, and the traffic light are located in front of the driving route of the vehicle.

14. The display apparatus according to claim 13, wherein the processor is further to determine that the speed limit sign is located in front of the driving route of the vehicle or behind the driving route of the vehicle.

15. The display apparatus according to claim 14, wherein the processor is further to determine that the current driving route of the vehicle comprises at least a first lane and a second lane.

16. The display apparatus according to claim 15, wherein when the vehicle travels in the first lane, the processor is further to display at least one of the electronic camera, the road sign, the traffic light, or the speed limit sign included in the first part of map elements and corresponds to the first lane.

17. The display apparatus according to claim 15, wherein when the vehicle travels from the first lane to the second lane, the processor is further to:

display at least one of the electronic camera, the road sign, the traffic light, or the speed limit sign included in the first part of map elements and corresponds to the second lane; and hide at least one of the electronic camera, the road sign, the traffic light, or the speed limit sign that corresponds to the first lane.

18. A non-transitory computer-readable storage medium having stored thereon executable instructions that, when executed by a processor of a recommendation device, cause the recommendation device to perform operations of:

obtaining a first map, wherein the first map comprises map elements related to a current driving route of a vehicle in which the recommendation device is located; and displaying a second map, wherein the second map comprises a first part of map elements from the map elements related to the current driving route, and map information irrelevant to the current driving route is hidden.

19. The non-transitory computer-readable storage according to claim 18, wherein the first part of map elements comprise at least one of the following:

an electronic camera, a road sign, a traffic light, or a speed limit sign.

20. The non-transitory computer-readable storage according to claim 19, wherein the electronic camera, the road sign, and the traffic light are located in front of the driving route of the vehicle.

* * * * *